United States Patent [19]

Reynolds

[11] 4,282,470
[45] Aug. 4, 1981

[54] CLOSE LOOP CONTROL APPARATUS AND METHOD FOR A FORCE REBALANCE TRANSDUCER

[75] Inventor: Christopher I. Reynolds, Walpole, Mass.

[73] Assignee: Northrop Corporation, Los Angeles, Calif.

[21] Appl. No.: 34,353

[22] Filed: Apr. 30, 1979

[51] Int. Cl.³ .............................................. B64C 17/02
[52] U.S. Cl. .................................. 318/648; 318/601; 73/517 B
[58] Field of Search ............... 318/648, 649, 601, 600, 318/602; 74/5.4; 73/517 B

[56] References Cited

U.S. PATENT DOCUMENTS

| 2,775,727 | 12/1956 | Kernahan et al. | 318/601 |
| 2,885,613 | 5/1959 | Myracle et al. | 318/601 |
| 3,742,324 | 6/1973 | Gross et al. | 318/600 X |
| 3,752,969 | 8/1973 | Kiffmeyer et al. | 318/601 X |
| 3,795,851 | 3/1974 | Gage et al. | 318/602 |
| 3,875,488 | 4/1975 | Crocker et al. | 318/648 |
| 4,020,485 | 4/1972 | Busby | 318/601 X |
| 4,102,202 | 7/1978 | Ferriss | 318/648 X |

Primary Examiner—B. Dobeck
Attorney, Agent, or Firm—Kenway & Jenney

[57] ABSTRACT

A closed loop control system for maintaining a force transducer assembly in a balanced position is disclosed. The control system has a feedback loop control circuit for providing a force rebalance signal at one of a plurality of predetermined discrete amplitude values during each of a plurality of successive equal duration time intervals. The signal has a constant amplitude during each interval. The control circuit further provides a respective digital representation for each amplitude value of the rebalance signal for each of the successive time intervals. Thereby, a precise determination of the value of the time-force product can be generated with the concomitant determination of the forces acting upon the force responsive transducer. The control system is particularly useful for non-linear transducers, such as square law devices where the time-force product is difficult to determine with continuously variable amplitude values.

19 Claims, 3 Drawing Figures

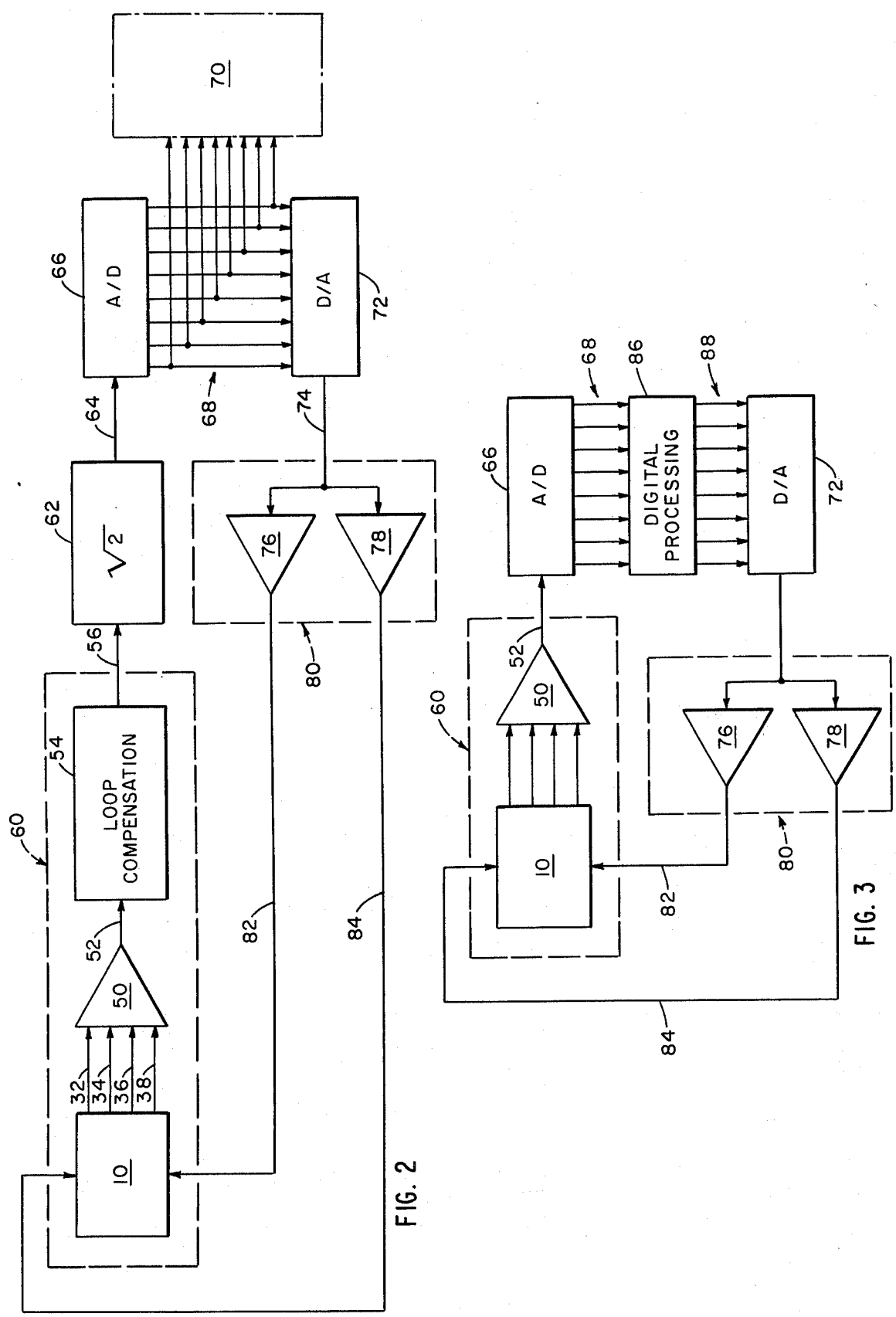

CLOSE LOOP CONTROL APPARATUS AND METHOD FOR A FORCE REBALANCE TRANSDUCER

BACKGROUND OF THE INVENTION

The invention relates in general to force transducers such as gyroscopes and accelerometers and in particular to a closed loop control apparatus and method which provides a precise definition of the forces applied to maintain a force transducer system in a selected balanced condition.

Force transducers represent a class of force responsive elements in which the component elements of the transducer respond to externally applied forces by deviating or perturbating from a selected known and measured orientation or position. The component elements also respond to applied restoring forces to return the respective component elements to their selected known orientation or position. Typically, a force transducer further includes sensing devices for providing error singals having, for example, signal amplitudes proportional to the perturbation, from the selected orientation, of the transducer component elements.

Typical examples of force transducers are the gyroscope and the accelerometer. In the gyroscope, pointing errors, that is, a change from a selected orientation caused by an axial displacement of the gyroscope structure, cause an internal sensing element to provide an error signal. Gyroscopes are typically operated in either a closed loop or open loop mode; and in the closed loop mode, electrical signals responsive to the error signal are applied to torque motors or similar devices within the gyroscope assembly to return the gyroscope to its original known orientation relative to its case. This return to the original orientation corresponds, in turn, to a reduction of the error signal amplitude generated through the sensing element.

Accelerometers similarly provide an error signal, generated by a sensing element, when the assembly is subject to a "disturbing" acceleration (dv/dt) force. The accelerometer, like the gyroscope, operates in an open or a closed loop configuration; and accelerometer "movement" from a known orientation is compensated for by the application of a balancing restoring force generated in response to the error signal.

For both the gyroscope and the accelerometer, the magnitude and duration of the applied restoring forces provide a measurement of the forces (and hence of other physical parameters such as distance and velocity) to which the force transducer was subjected. As a result, it is important to be able to accurately measure the magnitude and duration of the externally generated restoring forces.

Previously, externally generated restoring forces were typically derived either in a continuous analog feedback loop or in a closed loop wherein the time axis was finely quantized to control the time duration during which forces were applied to return or hold the force transducer to or at the selected orientation. Both of these methods of generating the rebalance restoring force can be improved (in differing amounts) because the methods are unable to determine, with great precision, the time-duration/amplitude product of the forces applied to the force transducer over time periods of interest.

In those force transducers wherein the electrical restoring force signals are linearly related to the resulting restoring force applied to the transducer system, the ability of the external control system to determine and integrate the applied forces over time is acceptable using available time quantized systems. But, as the need for greater speed and stability grows, designers are choosing more efficient torque motors in which the restoring force applied to the transducer is proportional to the square of the applied electrical signal. None of the prior systems provide sufficient stability, precision, or reliability to enable the integral of the applied restoring forces to be accurately generated; and hence they are unable to determine with the generally required accuracy, the various measurement parameters used for proper operation of the apparatus incorporating the transducer.

A principal object of the invention is therefore a high reliablity, stable, and precisely controlled closed loop apparatus and method which enables the accurate determination of measurement parameters in force transducer systems employing square law electro-mechanical torquing elements. Other objects of the invention are an electrically simple, cost effective, reliable apparatus employing proven technologies to provide an accurate force transducer control apparatus and method. Yet another object of the invention is a control circuit and method for a gyroscope or an accelerometer which enable precision readout and high performance.

SUMMARY OF THE INVENTION

The invention thus relates to a closed loop control system for maintaining a force transducer assembly in a balanced position. The transducer assembly has a sensing element which provides an error signal representing a sensed perturbation or misalignment from the balanced position and further has a rebalance transducer. The control system provides a force rebalance signal during each of a succession of time intervals to actuate the rebalance transducer. The rebalance transducer provides a restoring force to counteract the sensed perturbation to maintain the sensing element in the balanced position.

The invention features a feedback loop control circuit having an element responsive to the error signal for providing a respective digital representation for the rebalance signal for each of the successive time intervals, and an element responsive to the digital representations for providing the force rebalance signal to the rebalance transducer assembly during each time interval at one of a plurality of predetermined discrete amplitude values. The signal during each time interval has a constant amplitude.

In one particular aspect of the invention, the feedback control circuit features a square root element which is responsive to the error signal for providing an output signal having a value substantially equal to the square root of the value of the error signal; an analog-to-digital element for repeatedly generating, for each time interval, digital representations of the successive square root signals; a digital-to-analog element for providing an analog signal output having discrete amplitude values determined by the repeatedly generated digital representations; and a circuit element which is responsive to the analog signal output for deriving the force rebalance signal therefrom and for applying the rebalance signal to the rebalance transducer. Thereby, the digital representations correspond to the instantaneous restoring force applied to counteract the sensed perturbations and the restoring force has plural discrete values.

In yet another particular embodiment of the invention, the loop control circuit features an analog-to-digital element for repeatedly generating for each time interval a digital representation of the error signal; a digital processing element for generating a digital drive signal value, for each interval, in responsive to the respective digital representations; a digital-to-analog element for providing an analog output signal having discrete amplitude values determined by the digital drive signal values; and a circuit element responsive to the analog signal output for generating the force rebalance signal therefrom and for applying the rebalance signal to the rebalance transducer. Preferably, in this embodiment, the digital processing element is a digital computer.

In each of the embodiments of the invention, the operating system preferably has the digital measurement element which records the digital representations generated by the loop control circuit and which generates therefrom measurement data. That measurement data can be used for example to determine with great accuracy the forces acting upon the force transducer because the applied forces have known discrete amplitude values and known discrete constant time durations, thereby providing a highly accurate time duration/amplitude product.

The method of the invention relates to maintaining a force transducer assembly in a balanced position wherein the transducer assembly has a sensing element for providing an error signal representing sensed perturbations from the balanced position and wherein the assembly further has a rebalance transducer. The method features the steps of providing a force rebalance signal during each of a succession of equal duration time intervals; applying the force rebalance signal to actuate the rebalance transducer to provide a restoring force to counteract the sensed perturbations and to maintain the sensing element in the balance position; providing the force rebalance signal during each time interval at one of a predetermined plurality of discrete amplitude values; maintaining the signal level of the force rebalance signal constant during each time interval; and providing respective digital representations for the amplitude value of the rebalance signal for each of the time intervals.

DESCRIPTION OF THE DRAWINGS

Other objects, features, and advantages of the invention will appear from the following description of particular embodiments of the invention taken together with the drawings, in which:

FIG. 2 is an electrical schematic representation of a closed loop control circuit according to a first embodiment of the invention; and FIG. 3 is an electrical schematic representation of a closed loop control circuit according to a second embodiment of the invention.

DESCRIPTION OF PARTICULAR EMBODIMENTS

Figure 1:
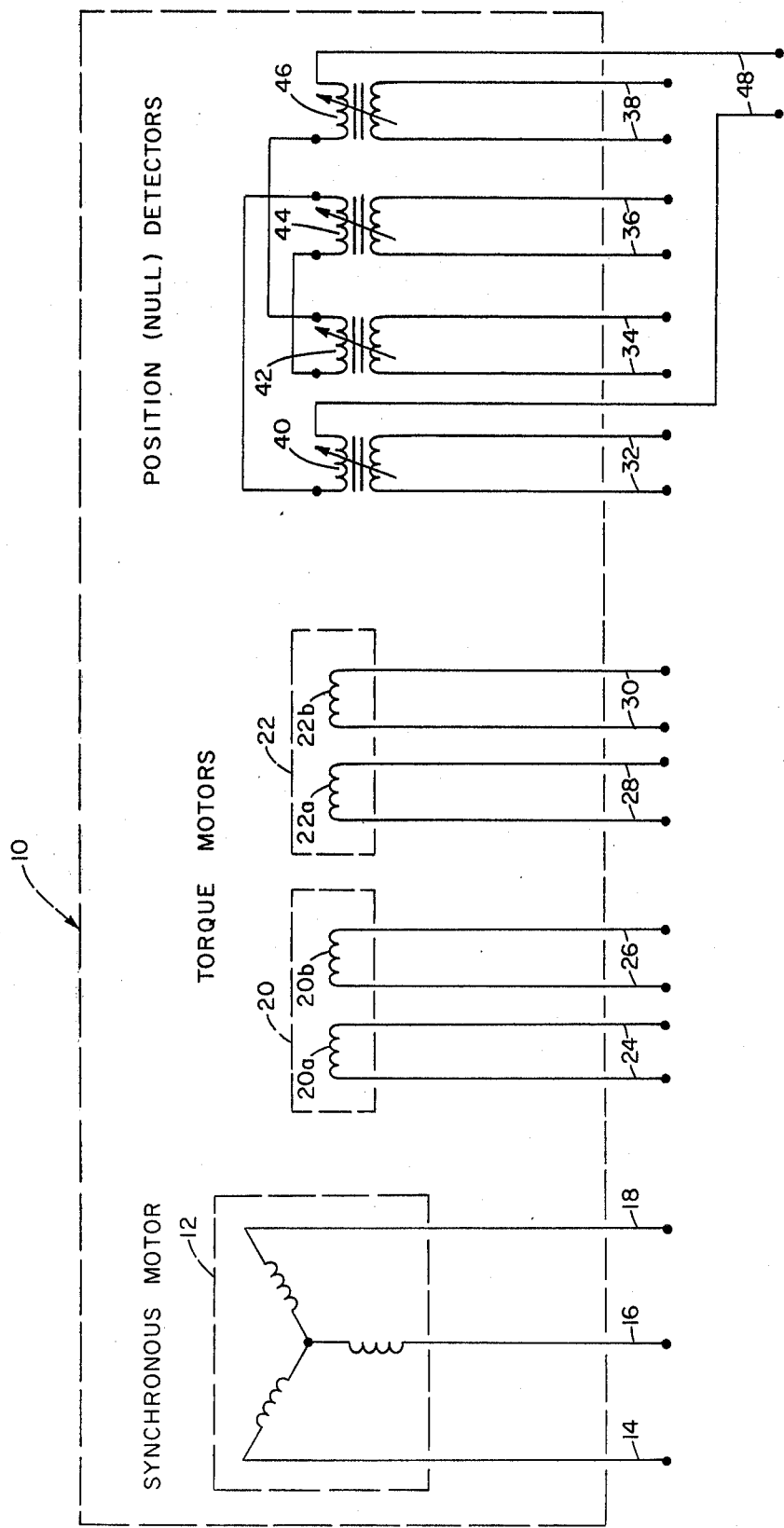
FIG. 1 is an electrical schematic representation of a typical force transducer useful according to the invention.

As noted above, the apparatus according to the invention is applicable to force transducer assemblies such as gyroscope and accelerometer assemblies. In particular, in those circumstances wherein the gyroscope is strapped down and force rebalance signals must be applied to a rebalance transducer to maintain a selected balanced condition within the gyroscope, the present invention provides precise data regarding the magnitude and direction of the restoring forces. This data then enables measurement calculations to be reliably and accurately performed.

Referring in particular to FIG. 1, a typical gryoscope assembly 10, with two sensitive axes and with which the invention is particularly advantageous, has a synchronous three-phase motor 12 which receives input power over lines 14, 16, and 18. Motor 12 is referred to in the art as the "spin wheel" or "rotor". After motor 12 has attained synchronous speed, force rebalance transducers, here torque motors 20 and 22 having coil windings 20a, 20b and 22a, 22b respectively, under the control of driving input force rebalance signals over lines 24, 26, 28, and 30, orient the axes of the synchronous motor to a desired position, the balanced condition. The position of the motor 12 axes is provided by output signals over output lines 32, 34, 36, and 38 of position sensing detectors 40, 42, 44, and 46 respectively. The balanced condition is most generally a "null condition" which corresponds to a signal output over lines 32, 34, 36, 38 of zero value. As is well known in the art, an AC input signal is provided to the series connected position detector coils over a line 48.

The illustrated gyroscope 10 is a typical two axis gyroscope. Other gyroscope assemblies could also be used including those having one or three independent axes. In the discussion which follows, only one axis of the illustrated two axis gyroscope assembly is described, it being understood that the other axis would operate, and be controlled in the same manner.

Referring now to FIG. 2, the gyroscope assembly 10 according to the invention is connected and operated in a closed loop configuration. Assuming for illustration, that it is the axis corresponding to torque motor 20 which is being controlled, the output signals from the gyroscope position detectors are provided over lines 32, 34, 36, 38 to a preamplifier 50 wherein the position detector output signals are combined (and demodulated as necessary) to provide a preamplifier output signal over a line 52. In general, and in the illustrated embodiment, a loop compensation element 54 provides desirable amplitude and phase compensation and provides at its output, over a line 56, what is designated the system error signal. The system error signal corresponds to the amount of deviation of the gyroscope axis (here the X axis) from a designated null or zero balanced position of the position detectors 40, 42, 44, 46. This null condition or position, generally represented by a zero amplitude error signal output from the loop compensation element 54, is employed to maintain a desired balanced condition for the gyroscope assembly.

The gyroscope assembly 10, the preamplifier 50, and the loop compensation element 54 thus combine to provide an error signal to the remainder of the closed loop. These elements, thus grouped together, are the force transducer system 60, it being understood that the components of the force transducer system 60 may vary in both composition and type depending upon the particular application. Thus, in other embodiments of the invention, preamplifier 50 may not require a demodulation circuit function, and/or loop compensation element 54 may not be required.

In the illustrated embodiment, the output of the force transducer system over line 56, the error signal, passes through a square root circuit element 62 which provides at its output over a line 64, a signal level output voltage which has an amplitude equal to the square root of the input voltage amplitude on line 56. Such circuits are well known in the art.

An analog-to-digital converter 66 receives the square root output over line 64 and provides, at a specified sampling clock rate, a digital number output over lines 68, the digital outputs representing in each successive equal duration time interval, defined by the clock period of the analog-to-digital converter, the signal level over line 64.

In the illustrated embodiment, the digital output of the analog-to-digital converter 66 specifies the restoring force to be applied to torque motor 20 (this being the X axis motor). The digital number represented by the signal levels over lines 68 thus represents precisely the restoring force applied by motor 20 and the clock period of A to D converter 66 represents the duration during which that force is applied. Consequently, the digital representations over lines 68 when applied to a digital measurement apparatus 70, which may be for example a computer, enable the precise determination of the time/force product applied to the gyroscope assembly 10 and hence a precise determination of the integral of the external forces being counteracted, that is, the forces which caused the gyroscope assembly to deviate from its balanced (null) position.

A digital-to-analog converter 72, having clock signals synchronized to the clock of the analog-to-digital converter (by connections not shown), provides an analog output signal over a line 74 which represents precisely the digital number representation over lines 68. The output of the digital-to-analog converter, which has one of a plurality of predetermined signal levels, is applied to amplifiers 76 and 78 which together form the restoring force amplifier 80. Amplifier 80 provides the force rebalance control signal to the torque motor of the respective axis of the gyroscope assembly 10 to counteract (or rebalance) the external forces applied (or being applied) to the gyroscope. The outputs of restoring force amplifier 80 over lines 82 and 84 thus represent the force rebalance signal applied to the gyroscope torque motors (for example over lines 24, 26 of FIG. 1), and these outputs assume one of a plurality of discrete values in each time interval or period. The closed loop operation of the system ensures that the gyroscope will return to its balanced position.

As is well known in the art, torque motors 20, 22 can be of at least two types. In one type, the torque motors provide a restoring force linearly proportional to the applied rebalance signal. In another type, employed in the illustrated embodiments, the rebalance transducers (torque motors 20 and 22) each provide a restoring force proportional to the square of the applied electrical force rebalance signals. It is, in part, to compensate for the square law relationship that element 62 is employed. The squre root circuit element 62 thus provides the needed mathematical relationship (vis-a-vis the illustrated torque motors 20, 22) which enables the restoring force to be accurately and properly related to the error signal. In addition to providing the correct mathematical relationship just referred to, however, the square root circuit 62 advantageously provides a dynamic range for small error signals over line 56, when they are later applied to the A to D converter, which is greater than would be available if the A to D converter acted directly upon the input error signal over line 56. This feature is described in greater detail below.

The square law relationship referred to above further and advantageously provides a mechanism wherein forces developed when the gyroscope is close to a null position are reduced, as a result of the squaring process, and an improved signal-to-noise ratio results. That is, if the digital-to-analog converter calls for a "zero" (or substantially "zero") restoring force, and the amplifiers 76 and 78 have some small noise or offset output signal, as will invariable happen, the square law relationship which results when the electrical force rebalance signal is converted to the restoring force in the gyroscope, reduces the small amplifier noise signal significantly causing a more precise closed loop operating system. For example, a noise level of "0.1" is reduced, by squaring, to a noise level of "0.01".

In a second embodiment according to the invention, the loop compensation element 54 and the square root circuit element 62 are replaced by a digital processing element 86 (FIG. 3). Processing element 86 is incorporated in the loop between the analog-to-digital converter 66 and the digital-to-analog converter 72.

Referring to FIG. 3, in which like reference numerals refer to like parts, the FIG. 2 square root circuitry 62 and loop compensation element 54 have (as noted above) been replaced by the digital processing element 86. The digital processing element 86 can be for example a suitably programmed digital computer or a hard wired digital circuit. In either case, the function of processing element 86 is to take the sequence of digital words provided over lines 68 at clock times determined by the clock repetition rate of the illustrated analog-to-digital converter 66 and to process each of those digital words to maintain a stable feedback loop. Processing element 86 provides, if necessary, the square root function originally performed by circuit 62, and provides, at periodic time intervals, the digital output signals over lines 88. The digital output signals over lines 88 represent the amplitude of the restoring force to be applied to gyroscope assembly 10.

In this second embodiment of the invention, if the restoring force applied to the gyroscope assembly 10 is linearly related to the output signal of the restoring force amplifiers 80 (as will be the case for earlier gyroscope designs), then the digital processing element 86 will not effect the square root function. If the restoring force is proportional to the square of the rebalance force electrical signal output of amplifiers 80, element 86 will effect the square root function.

Whether or not the square root function is implemented in the FIG. 3 embodiment, the dynamic range of the illustrated FIG. 3 embodiment at small amplitude error signal values is less than in the FIG. 2 embodiment. This phenomenon results from the loss of the square root function provided by square root circuitry 62 prior to the digitization of the error signal. The square root function provides for an increased digital precision of small amplitude error signals because the square root circuit provides a non-linear transformation of the error signal, and in particular, a transformation in which the large amplitude signal values are compressed in comparison to the smaller amplitude values. Thus, for the same number of binary bits in a digital representation (i.e. the output of the analog-to-digital converter 66) the second embodiment, represented schematically in FIG. 3, provides a reduced dynamic range for the smaller amplitudes when compared to the embodiment described in FIG. 2. In other words, the FIG. 2 embodiment provides more precision where it is needed, in the small amplitude values of the error signal.

The several circuit elements called for by the particular embodiments of the described invention are well within the skill of one practiced in the art, in view of the description above. Additions, subtractions, deletions, and other modifications of the described embodiments of the invention will be obvious to those skilled in the art and are within the scope of the following claims.

What is claimed is:

1. In a closed loop control system for maintaining a force transducer assembly in a balanced position, said transducer assembly having a sensing element for providing an error signal representing a sensed perturbation from said balanced position, said assembly having a rebalance transducer, and said system providing a force rebalance signal during each of a succession of time intervals to actuate said rebalance transducer to provide a restoring force to counteract a said sensed perturbation for maintaining said sensing element in said balanced position, the improvement comprising a feedback loop control circuit having
means responsive to said error signal for providing a respective digital representation for the rebalance signal for each of said successive time intervals, and
means responsive to said digital representations for providing said force rebalance signal to said rebalance transducer assembly during each time interval at one of a plurality of predetermined discrete amplitude values, said rebalance signal having a constant amplitude during each said interval.

2. The closed loop control system of claim 1 wherein said circuit comprises
square root means responsive to said error signal for providing an output signal having a value substantially equal to the square root of the value of said error signal,
an analog-to-digital element for repeatedly generating, for each time interval, a said digital representation of said square root signal,
a digital-to-analog element for providing an analog signal output having discrete amplitude values determined by said repeatedly generated digital representations, and
circuit means responsive to said analog signal output for deriving said force rebalance signal therefrom and for applying said rebalance signal to said rebalance transducers,
whereby said digital representations correspond to the instantaneous restoring force applied to counteract said sensed perturbations and said restoring force has plural discrete values.

3. The closed system of claim 2 wherein said control circuit further comprises
a loop compensation element responsive to said error signal for generating a loop compensation signal and further wherein
said square root means is responsive to said loop compensation signal.

4. The closed loop system of claim 3 wherein said rebalance transducer further comprises
means responsive to said rebalance signal for generating a said restoring force having a value proportional to the square of the value of said rebalance signal.

5. The closed loop control system of claim 1 further comprising
digital measurement means for recording said digital representations and for generating measurement data in response thereto.

6. The closed loop control system of claim 1 wherein said circuit comprises
an analog-to-digital element for repeatedly generating for each time interval a said digital representation of said error signal,
digital processing means for generating a digital drive signal value for each said interval in response to said digital representations,
a digital-to-analog element for providing an analog output signal having discrete amplitude values determined by said digital drive signal values, and
circuit means responsive to said analog signal output for generating said force rebalance signal therefrom, and for applying said rebalance signal to said rebalance transducer.

7. The closed loop control system of claim 6 wherein said digital processing means is a digital computer.

8. The closed loop control system of claim 1 wherein said force transducer is a gyroscope assembly.

9. The closed loop control system of claim 1 wherein said force transducer is an accelerometer assembly.

10. In a closed loop control system for maintaining a gyroscope in a balanced position, said gyroscope having a sensing element for providing an error signal representing sensed positional misalignments from said balanced position, said gyroscope further having a torque motor, and said system providing a force rebalance signal during each of a succession of time intervals to actuate said torque motor to provide a restoring force to counteract any sensed misalignments in order to maintain said sensing element in said balanced position,
the improvement comprising
a feedback control circuit
for providing said force rebalance signal during each time interval at one of a predetermined plurality of discrete amplitude values, said signal having a constant amplitude during each said time interval, and
for providing a respective digital representation corresponding to each amplitude value of the rebalance signal for each of said successive intervals, and
digital measurement means responsive to the digital representation for said successive time intervals for generating measurement data describing the forces effecting gyroscope movements.

11. The closed loop control system of claim 10 wherein said feedback loop control circuit comprises
square root means responsive to said error signal for providing an output signal having a value substantially equal to the square root of the value of said error signal,
an analog-to-digital element for repeatedly generating, for each time interval, a said digital representation of said square root signal,
a digital-to-analog element for providing an analog signal output having discrete amplitude values determined by said repeatedly generated digital representation, and
circuit means responsive to said analog signal output for deriving said force rebalance signal therefrom and for applying said rebalance signal to said torque motor, whereby said digital representations correspond to the instantaneous restoring force applied to counteract said sensed misalignments and said restoring force has plural discrete values.

12. The closed loop control system of claim 10 wherein said feedback loop control circuit comprises
an analog-to-digital element for repeatedly generating for each time interval a said digital representation of said error signal,
digital processing means for generating a digital drive signal value for each said interval in response to said digital representations,
a digital-to-analog element for providing an analog output signal having discrete amplitude values determined by said digital drive signal values, and
circuit means responsive to said analog signal output for generating said force rebalance signal therefrom, and for applying said rebalance signal to said torque motor.

13. In a closed loop control system for maintaining an accelerometer assembly in a balanced position, said accelerometer assembly having a sensing element for providing an error signal representing sensed positional misalignments from said balanced position, said accelerometer assembly further having a torque motor, and said system providing a force rebalance signal during each of a succession of time intervals to actuate said torque motor to provide a restoring force to counteract any sensed misalignments in order to maintain said sensing element in said balanced position, the improvement comprising
a feedback control circuit
for providing said force rebalance signal during each time interval at one of a predetermined plurality of discrete amplitude values, said signal having a constant amplitude during each said time interval, and
for providing a respective digital representation corresonding to each amplitude value of the rebalance signal for each of said successive intervals, and
digital measurement means responsive to the digital representation for said successive time intervals for generating measurement data describing the forces effecting accelerometer assembly movements.

14. The closed loop control system of claim 13 wherein said feedback loop control circuit comprises
square root means responsive to said error signal for providing an output signal having a value substantially equal to the square root of the value of said error signal,
an analog-to-digital element for repeatedly generating, for each time interval, a said digital representation of said square root signal,
a digital-to-analog element for providing an analog signal output having discrete values determined by said repeatedly generated digital representation, and
circuit means responsive to said analog signal output for deriving said force rebalance signal therefrom and for applying said rebalance signal to said torque motor,
whereby said digital representations correspond to the instantaneous restoring force applied to counteract said sensed misalignments and said restoring force has plural discrete values.

15. The closed loop control system of claim 13 wherein said feedback loop control circuit comprises
an analog-to-digital element for repeatedly generating for each time interval a said digital representation of said error signal,
digital processing means for generating a digital drive signal value for each said interval in response to said digital representations,
a digital-to-analog element for providing an analog output signal having discrete amplitude values determined by said digital drive signal values, and
circuit means responsive to said analog signal output for generating said force rebalance signal therefrom and for applying said rebalance signal to said torque motor,
whereby said digital representations correspond to the instantaneous restoring force applied to counteract said sensed misalignments and said restoring force has plural discrete values.

16. In a closed loop control system for maintaining a force transducer assembly in a balanced position, said transducer assembly having a sensing element for providing an error signal representing a sensed perturbation from said balanced position, said assembly having a rebalance transducer, and said system providing a force rebalance signal during each of a succession of time intervals to actuate said rebalance transducer to provide a restoring force to counteract a said sensed perturbation for maintaining said sensing element in said balanced position, the improvement comprising
a feedback loop control circuit having
means responsive to said error signal for providing a respective digital representation for the rebalance signal for each of said successive time intervals, and
means responsive to said digital representations for providing said force rebalance signal to said rebalance transducer assembly during each time interval at one of a plurality of predetermined discrete amplitude values, said rebalance signal having a constant amplitude during each said interval, and
means for determining from said digital representations, a cumulative resulting restoring force applied by said rebalance transducer to said force transducer assembly.

17. A method for maintaining a force transducer assembly in a balanced position wherein said transducer assembly has a sensing element providing an error signal representing sensed perturbations from said balanced position and wherein said assembly has a rebalance transducer, said method comprising the steps of
providing a force rebalance signal during each of a succession of equal duration time intervals,
applying said force rebalance signal to actuate said rebalance transducer to provide a restoring force to counteract said sensed perturbations and nt comprising
a feedback loop control circuit having
means responsive to said error signal for providing a respective digital representation for the rebalance signal for each of said successive time intervals, and
means responsive to said digital representations for providing said force rebalance signal to said rebalance transducer assembly during each time interval at one of a plurality of predetermined discrete amplitude values, said rebalance signal having a constant amplitude during each said interval, and
means for determining from said digital representations, a cumulative resulting restoring force applied by said rebalance transducer to said force transducer assembly.

18. The method of claim 17 further comprising the steps of generating a square root signal equal substantially to the square root of said error signal, converting said square root signal to a digital value during each time interval, using said digital representations to provide an analog signal output having discrete amplitude values determined by said repeatedly generated digital representations, and applying said analog signal to said rebalance transducer, whereby said digital representations correspond to the instantaneous restoring force applied to counteract the sensed perturbations, and wherein said restoring force has plural discrete values.

19. The method of claim 17 further comprising the steps of converting said error signal to a digital representation for each time interval, digitally processing each of said digital representations, corresponding to each time interval, for generating a succession of digital drive signal values for said time intervals, generating an output signal having discrete amplitude values determined by said digital drive signal values for each time interval, and generating said force rebalance signal from said analog signal output.

* * * * *